United States Patent
Yamamoto et al.

(10) Patent No.: US 7,754,383 B2
(45) Date of Patent: Jul. 13, 2010

(54) NON-AQUEOUS ELECTROLYTE SECONDARY BATTERY, NEGATIVE ELECTRODE MATERIAL THEREFOR, AND METHOD OF MANUFACTURING THE NEGATIVE ELECTRODE MATERIAL

(75) Inventors: Teruaki Yamamoto, Osaka (JP); Masaki Hasegawa, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 11/793,528

(22) PCT Filed: Dec. 12, 2006

(86) PCT No.: PCT/JP2006/324715

§ 371 (c)(1),
(2), (4) Date: Jun. 20, 2007

(87) PCT Pub. No.: WO2007/072704

PCT Pub. Date: Jun. 28, 2007

(65) Prior Publication Data

US 2008/0081260 A1    Apr. 3, 2008

(30) Foreign Application Priority Data

Dec. 19, 2005   (JP) ............................. 2005-364601

(51) Int. Cl.
*H01M 4/36* (2006.01)
*H01M 4/52* (2006.01)
*C22C 29/00* (2006.01)

(52) U.S. Cl. ............... 429/218.1; 429/221; 429/223; 429/224; 429/231.5; 429/231.95; 429/246; 423/325; 423/326; 423/594.15; 423/599; 423/606; 423/608; 423/632; 420/117; 420/578; 428/472; 428/472.1

(58) Field of Classification Search ............ 423/594.15, 423/599, 606, 608, 632, 325, 326; 429/218.1, 429/224, 246, 231.95, 221, 223, 231.5; 428/472, 428/472.1; 420/117, 578
See application file for complete search history.

(56) References Cited

U.S. PATENT DOCUMENTS

2004/0108486 A1 *  6/2004  Yoshida et al. ........... 252/62.54

(Continued)

FOREIGN PATENT DOCUMENTS

JP    2000226209    *    8/2000

(Continued)

OTHER PUBLICATIONS

Machine translation of Nakamoto et al (JP2004-319469).*

(Continued)

*Primary Examiner*—Melvin C Mayes
*Assistant Examiner*—Jun Li
(74) *Attorney, Agent, or Firm*—Wenderoth, Lind & Ponack, L.L.P.

(57) ABSTRACT

A negative electrode material for a non-aqueous electrolyte secondary battery comprising an alloy including silicon and a transition metal selected from the group consisting of titanium, zirconium, vanadium, molybdenum, tungsten, iron, and nickel; and a silicon oxide film and an oxide film of the transition metal formed on a surface of the alloy wherein the alloy includes an A phase including silicon and a B phase including a crystalline alloy of silicon and the transition metal. The negative electrode material has a silicon oxide film and an oxide film of the transition metal on the surface of the alloy wherein the thickness ratio of the transition metal oxide film to the silicon oxide film is at least 0.44 and smaller than 1.

5 Claims, 2 Drawing Sheets

U.S. PATENT DOCUMENTS

2004/0241548 A1 12/2004 Nakamoto et al.
2005/0276931 A1* 12/2005 Che et al. .................. 427/569

FOREIGN PATENT DOCUMENTS

| JP | 2001-250540 | 9/2001 |
|---|---|---|
| JP | 2004-185810 | 7/2004 |
| JP | 2004-319469 | 11/2004 |
| JP | 2004-335272 | 11/2004 |
| JP | 2005-116509 | 4/2005 |
| JP | 2006-66370 | 3/2006 |

OTHER PUBLICATIONS

Machine translation of Shimamura et al (JP2004-335272).*
Machine translation of Kawakami et al (JP2004-185810).*

* cited by examiner

NON-AQUEOUS ELECTROLYTE SECONDARY BATTERY, NEGATIVE ELECTRODE MATERIAL THEREFOR, AND METHOD OF MANUFACTURING THE NEGATIVE ELECTRODE MATERIAL

This application is a 371 application of PCT/JP2006/324715, filed Dec. 12, 2006.

TECHNICAL FIELD

The present invention relates to a negative electrode material for a non-aqueous electrolyte secondary battery and a method of manufacturing the negative electrode material.

BACKGROUND ART

Non-aqueous electrolyte secondary batteries represented by lithium secondary batteries have high electromotive force and high energy density. For this reason, non-aqueous electrolyte secondary batteries are used as the main power supplies of mobile communications equipment and portable electronic equipment. Further, demand for non-aqueous electrolyte secondary batteries as a memory backup power supply is increasing year by year. Non-aqueous electrolyte secondary batteries with higher energy density are strongly demanded so that equipment using those batteries has a smaller size and higher performance, and achieves being maintenance-free.

To meet this demand, silicon materials having a larger theoretical capacity than carbon material are drawing attention. The theoretical capacity of silicon that stores and emits lithium ions is larger than that of graphite, lithium metals, aluminum, or the like.

However, when crystalline silicon stores lithium ions during charging, it expands to have a volume four times as large as the original volume at the maximum. For this reason, when silicon is used as a negative electrode material, it is deformed by the volumetric change and pulverized, and thus the electrode structure is destroyed. To address this problem, Patent Document 1, for example, proposes a method of making a phase including silicon into an amorphous state, and using composite particles made of a crystalline alloy phase of silicon and a transition metal and amorphous phase of silicon as a negative electrode so that pulverization of silicon is inhibited. Patent Document 2, for example, proposes a method of forming thick oxide films on the surfaces of particles by heat treatment and improving the high temperature storage characteristics.

However, Patent Document 1 does not discuss the thickness of the oxide films on the surface thereof sufficiently. Patent Document 2 sufficiently discusses the thickness of the silicon oxide film, but does not discuss the thickness of the oxide film of the transition metal. Thus, these techniques cannot provide a negative electrode material with excellent overcharge-resistant characteristics, which is one of important characteristics of a memory backup power supply.

Patent Document 1: Japanese Patent Unexamined Publication No. 2004-335272

Patent Document 2: Japanese Patent Unexamined Publication No. 2004-319469

SUMMARY OF THE INVENTION

The present invention provides a negative electrode material for a non-aqueous electrolyte secondary battery having excellent overcharge-resistant characteristics, and a method of manufacturing the negative electrode material. The negative electrode material for a non-aqueous electrolyte secondary battery of the present invention includes silicon and a transition metal, and has a silicon oxide film and an oxide film of the transition metal on the surface of the material. The thickness ratio of the transition metal oxide film to the silicon oxide film is at least 0.44 and smaller than 1. This structure improves the overcharge-resistant characteristics of the negative electrode material. Such a negative electrode material can be prepared by mechanically alloying a material including silicon and a transition metal, and forming a silicon oxide film and a transition metal oxide film on the surface of the material using $H_2O$ and $O_2$.

DETAILED DESCRIPTION OF PREFERRED EMBODIMENT

Figure 1:
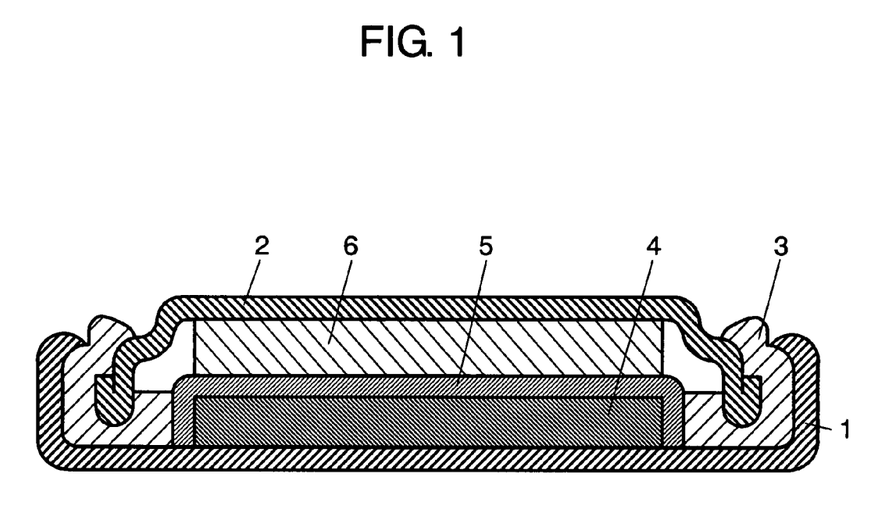
FIG. 1 is a sectional view of a coin-shaped battery using a negative electrode material for a non-aqueous electrolyte secondary battery in accordance with an exemplary embodiment of the present invention.

FIG. 1 is a sectional view of a coin-shaped battery using a negative electrode material for a non-aqueous electrolyte secondary battery in accordance with an exemplary embodiment of the present invention. Positive electrode can 1 also works as a positive electrode terminal, and is made of a highly-corrosive stainless steel, for example. Negative electrode can 2 also works as a negative electrode terminal, and is made of a stainless steel of the same material as positive electrode can 1. Gasket 3 made of polypropylene, for example, insulates positive electrode can 1 and negative electrode can 2 electrically. Pitch (not shown) is applied to the contact surface between positive electrode can 1 and gasket 3, and the contact surface between negative electrode can 2 and gasket 3. Positive electrode 4 includes an active material capable of storing and emitting lithium ions. Such active materials include $Li_{0.55}MnO_2$, $Li_4Mn_5O_{12}$, $Li_2Mn_4O_9$, $LiCoO_2$, and $LiNiO_2$. Positive electrode 4 further includes a conductive agent such as acetylene black, and a binder such as fluorocarbon resin represented by polyvinylidene fluoride.

Negative electrode 6 includes a negative electrode material capable of storing and emitting lithium ions, a conductive agent such as acetylene black and carbon black, and a binder such as fluorocarbon resin and polyacrylic acid. During assembly, lithium foil is press-fitted on the surface of negative electrode 6 (on the separator side) so that lithium is stored into negative electrode 6 in the presence of a non-aqueous electrolyte. Thus, a lithium alloy is electrochemically formed and used as negative electrode 6. The amount of the lithium foil is determined in consideration of the irreversible capacity.

Separator 5 made of non-woven fabric of polypropylene, for example, is disposed between positive electrode 4 and negative electrode 6. Separator 5 is impregnated with an electrolyte solution not shown. In other words, the electrolyte solution as a non-aqueous electrolyte is disposed between positive electrode 4 and negative electrode 6. As the electrolyte solution, known materials for lithium secondary batteries can be used. In other words, a solution containing a lithium salt dissolved in an organic solvent is used as the electrolyte solution. Alternatively, a polymer can be added to such an electrolyte solution to provide a gelled non-aqueous electrolyte.

Figure 2:
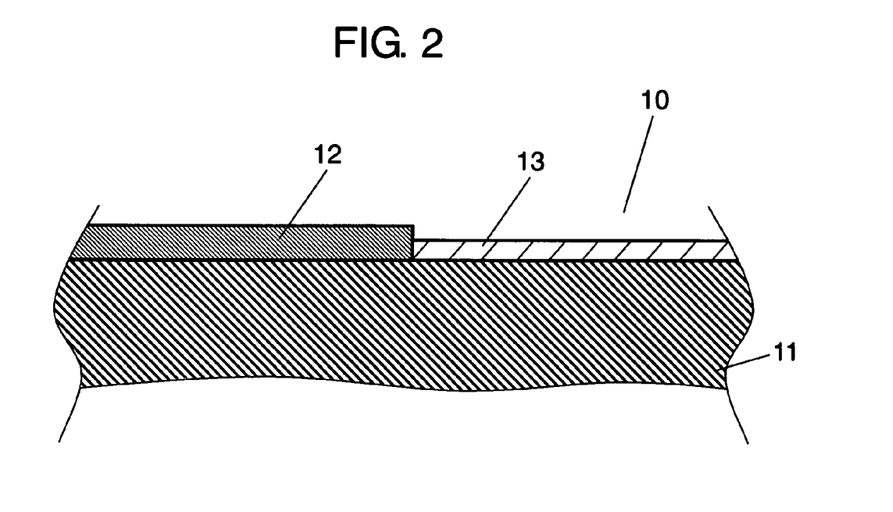
FIG. 2 is an enlarged schematic diagram near a surface of the negative electrode material for the non-aqueous electrolyte secondary battery in accordance with the exemplary embodiment of the present invention.

FIG. 2 shows an example of an enlarged schematic diagram near the surface of the negative electrode material included in the negative electrode. Negative electrode material 10 is composed of alloy 11 containing silicon (Si) and a transition metal, and Si oxide film 12 and transition metal oxide film 13, both formed on alloy 11. The thickness ratio of transition metal oxide film 13 to Si oxide film 12 is at least 0.44 and smaller than 1.

The thickness of transition metal oxide film 13 has a large influence on the overcharge-resistant characteristics of batteries using therein. This is considered to relate to the fact that the transition metal is likely to be oxidized during overcharge. To be oxidized, the transition metal deprives Si oxide film 12 of oxygen, and Si activated by losing oxygen reacts with the non-aqueous electrolyte. It is considered that such a series of reactions decrease the overcharge-resistant characteristics. For this reason, formation of oxide film 13 having a sufficient thickness on the surface of the transition metal can inhibit the reaction between Si and the non-aqueous electrolyte.

In particular, the thickness of oxide film 13 is influenced not only by oxygen gas in the atmosphere during preparation, but also by the water vapor amount in the atmosphere. The degree of this influence on oxide film 13 is larger than that on Si oxide film 12. Thus, treatment in an atmosphere containing water vapor can form oxide film 13 sufficiently thick for maintaining overcharge-resistant characteristics even in an environment of low temperatures, such as the room temperature.

Further, even when the thickness of oxide film 13 is considered sufficient, a large thickness ratio of oxide film 13 to oxide film 12 decreases overcharge-resistant characteristics. This is considered because the surface shape gives an influence on the overcharge-resistant characteristics. For this reason, it is preferable that the thickness ratio of oxide film 13 to oxide film 12 is at least 0.44 and smaller than 1. With this structure, a negative electrode material for a non-aqueous electrolyte secondary battery having excellent overcharge-resistant characteristics can be prepared.

It is considered that the surface shape is more complicated at thickness ratios of oxide film 13 to oxide film 12 smaller than 0.44. This complicated shape decreases the overcharge-resistant characteristics. Only when only transition metal oxide film 13 is intentionally formed on the surface by coating or other methods, the thickness ratio of oxide film 13 to oxide film 12 can be 1 or larger.

The thickness of oxide films 12 and 13 can be measured by X-ray photoelectron spectroscopy, for example. Specifically, area intensity ratios of $SiO_x/Si$ and area intensity ratios of transition metal oxide/transition metal are determined on the outermost surface and at every depth at which ion etching is performed. The ion etching is performed at an accelerating voltage of 500V, an etching angle of 90°, an ion current density of 32 $\mu A/cm^2$, and an etching rate of approx. 1 nm/min. on a $SiO_2$ basis. Then, the thickness at a depth at which the area intensity ratio is ½ of the area intensity ratio on the outermost surface is determined, and defined as the thickness of each of oxide films 12 and 13. The half value width of $SiO_x$ is assumed 2.49 eV, and that of Si is assumed 2.09 eV. When the transition metal is titanium (Ti), the peak of Ti 2p ½ (2p orbital, spin ½) is overlapped with the peak of $TiO_x$. Thus, area intensity T of $TiO_x$ is calculated using the ratio of the area intensity of Ti 2p ½ to the area intensity of Ti 2p ¾ (a=0.53) after etching at a depth of approx. 20 nm (on $SiO_2$ basis), according to equation (1):

$$T=T(460\ eV)-0.53 \times T(454\ eV) \quad (1)$$

Here, T (460 eV) and T (454 eV) show the area intensity ratios at 460 eV and 454 eV, respectively.

The electric charge on the outermost surface is corrected with the area intensity of hydrocarbon ($CH_n$: 285 eV), and the electric charge after etching is corrected with the area intensity of Si 2p (99 eV).

It is preferable that alloy 11 is composed of composite particles, each made of an A phase including Si, and a B phase including a crystalline alloy of Si and a transition metal. Such a structure promotes miniaturization of the A phase and improves electron conductivity in the composite particles.

Further, it is preferable that the A phase is amorphous or microcrystalline. Now, the amorphous state herein means that the crystallite size is up to approx. 2 nm, the diffraction pattern of the material does not have a clear peak attributed to the crystal plane in the X-ray diffraction analysis of the material using CuKα rays, and only a broad diffraction pattern is obtained. The microcrystalline state means that the crystallite size is up to 20 nm. These states can be observed using a transmission electron microscope (TEM). However, the common way is to determine the states from the half value width of the peak obtained from X-ray diffraction, using Scherrer's equation. When the crystallite size is larger than 20 nm, the mechanical strength of the particles cannot follow the volumetric change during charge/discharge. Thus, cracking of the particles or deterioration of the current-collecting state may occur, which tends to decrease the charge/discharge efficiency and charge/discharge cycle life of the battery.

Effective methods of forming an alloy made of an amorphous, a microcrystal, or a mixture thereof include mechanical alloying, i.e. direct synthesis by mechanical pulverization and mixing using a ball mill, vibrating mill, planetary ball mill, or the like. Among these, the use of a vibrating mill is most preferable in terms of processing amount.

Transition metals to be alloyed with Si include Ti, zirconium (Zr), vanadium (V), molybdenum (Mo), tungsten (W), iron (Fe), and nickel (Ni). Among these elements, Si-transition metal alloys using at least one of Ti, Fe, and Ni have low electron resistance, and are easily obtainable and thus industrially preferable. For example, titanium disilicate ($TiSi_2$) is preferable. Si-transition metal alloys are inactive to lithium. For this reason, as mentioned above, it is preferable to use composite particles, each made of at least two phases, i.e. an A phase including Si, and a B phase including a Si-transition metal alloy, to achieve higher capacity and lower electron resistance at the same time.

Preferably, the molar ratio of Si and the transition metal ranges from 69:31 to 98:2. In other words, the percentage of the number of moles of Si in alloy 11 is preferably at least 69% and at most 98%. More preferably, the percentage is at least 74% and at most 95%.

When the molar percentage of Si is smaller than 69%, the portion of the A phases, i.e. the Si phases active to lithium becomes small in negative electrode material 10, and thus the capacity density thereof is smaller than that of graphite. When the molar percentage of Si is larger than 98%, the volumetric change is equivalent to that of the element Si, thus making it difficult to maintain the current-collecting structure in negative electrode 6. Thus, the capacity retention ratio after cycles decreases. It is most preferable that the molar percentage of Si is at least 74% and at most 95%, to achieve a higher capacity and cycle capacity retention ratio at the same time.

Next, a description is provided of a method of manufacturing negative electrode material 10. First, a material including Si and a transition metal is mechanically alloyed in an inert gas atmosphere. Then, Si oxide film 12 and transition metal oxide film 13 are formed on the surface of the mechanically-alloyed material using $H_2O$ and $O_2$. Oxide films 12 and 13 are formed by introduction of oxygen gas into the inert gas atmosphere and then are grown by further introduction of water vapor.

When Si and the transition metal are mechanically alloyed for synthesis of an alloy, the procedure is preferably performed in an inert gas atmosphere, and more preferably in argon gas. In an atmosphere including nitrogen, the transition metal forms a nitride, thus causing deterioration of electron conductivity and variations in the capacity. In an atmosphere including oxygen, the irreversible capacity increases. Further, in that atmosphere, explosion can occur during the synthesis. Thus, it is preferable to maintain the atmosphere in a sufficiently low concentration of oxygen. In an atmosphere including moisture, hydrogen is generated. Thus, it is preferable to sufficiently dry the material and maintain a sufficiently low dew point of the gas to be used.

Further, it is preferable to use an argon/oxygen mixed gas when oxide films 12 and 13 are initially formed after alloy 11, i.e. a Si-transition metal alloy, is synthesized. In an atmosphere including nitrogen, particularly the transition metal forms a nitride, thus causing deterioration of surface conductivity and variations in the amount of irreversible capacity. In an atmosphere including moisture, hydrogen is generated. Thus, it is preferable to set a sufficiently low dew point of the gas to be used particularly for forming initial oxide films.

Methods of forming oxide films 12 and 13 on the surface of alloy 11 includes continuous and gradual introduction of oxygen at a small flow into a hermetically sealed container having a stirring function. Instead of the procedure, a stepwise introduction of oxygen can be applied. In the stepwise introduction, 1/50 of the required amount is repeatedly introduced and then the next portion is introduced after the completion of heat generation is confirmed. It is further preferable to use a heat release mechanism, such as a water cooling jacket, because the mechanism inhibits a temperature rise in the material and shortens the treatment time. Such specific containers include a vibrating dryer and a kneader. Oxygen gas and water vapor gas may be introduced at the same time to form oxide films 12 and 13.

Preferably, the water vapor amount in the atmosphere for growing oxide films 12 and 13 is 6.2 $g/m^3$ or more, and more preferably, 10 $g/m^3$ or more. When the amount is smaller than 6.2 $g/m^3$, the time necessary to grow oxide films 12 and 13 is longer, thus decreasing productivity. When heating or bubbling makes the water vapor amount extremely larger than the saturated aqueous vapor amount in the treatment atmosphere or at the temperature of cooling water, condensation may occur and drying may be needed. For this reason, it is preferable to treat the alloy at a temperature near the ambient temperature and a high humidity (ideally, a relative humidity of 100%).

The mechanically alloyed material may be immersed into water so that oxide films 12 and 13 are formed and grown. It is preferable to use ion-exchange water in terms of quality control. Further, it is preferable to prepare an amount of water sufficient for the Si-transition metal alloy (alloy 11) and a cooling mechanism so that a rapid temperature rise can be avoided. Because growing oxide films 12 and 13 requires water and oxygen, it is preferable to bubble the water to sufficiently dissolve oxygen therein. Because bringing the alloy into contact with water immediately after synthesis rapidly oxides the surface thereof or generates hydrogen, it is preferable to introduce oxygen gas into the inert gas atmosphere to form oxide films on the surface beforehand.

Preferably, the specific surface area of negative electrode material 10 ranges from 0.5 $m^2/g$ to 20 $m^2/g$. When the specific surface area is smaller than 0.5 $m^2/g$, the smaller area in contact with the non-aqueous electrolyte decreases the charge/discharge efficiency. When the specific surface exceeds 20 $m^2/g$, excessive reactivity with the non-aqueous electrolyte increases the irreversible capacity. Preferably, the average particle diameter of negative electrode material 10 ranges from 0.1 to 20 μm. When the average particle diameter of negative electrode material 10 is smaller than 0.1 μm, the large surface area of the material excessively increases the reactivity with the non-aqueous electrolyte and increases the irreversible capacity. When the average particle diameter exceeds 20 μm, the small surface area of the material decreases the contact area with the non-aqueous electrolyte and decreases the charge/discharge efficiency.

Preferably, negative electrode 6 for use in a coin-shaped battery is a mold having a thickness ranging from 0.05 mm to 2.0 mm. Forming as a mold eliminates a current collector for maintaining the shape and increases the capacity of the battery. This structure is particularly effective for a small battery such as a backup power supply. However, when the thickness of negative electrode 6 is smaller than 0.05 mm, the lower strength of the mold makes it difficult to maintain the shape or manufacture a battery, or deteriorates battery characteristics. When the thickness of negative electrode 6 exceeds 2.0 mm, the diffusion of lithium ions in negative electrode 6 extremely decreases, thus deteriorating the charge/discharge efficiency. Although the expansion and shrinkage during the charge/discharge of negative electrode 6 are large, the above thickness range includes both charging and discharging states. The thickness of negative electrode 6 can be confirmed with an X-ray computer tomography (CT) or the like without decomposing the battery.

Preferable active materials for use in positive electrode 4 include $Li_{0.55}MnO_2$, $Li_4Mn_5O_{12}$, and $Li_2Mn_4O_9$. The compositions of these materials are those before charging/discharging. When the battery is charged or discharged, the content value of lithium is changed. The positive electrode active material is not limited to the above compounds, and those capable of storing and emitting lithium ions can be used.

Positive electrode 4 for use in a coin-shaped battery is a mold having a thickness ranging from 0.30 mm to 3.0 mm. Similar to negative electrode 6, forming as a mold eliminates a current collector for maintaining the shape and increases the capacity of the battery. This structure is particularly effective for a small battery such as a backup power supply. When the thickness of positive electrode 4 is smaller than 0.30 mm, the thickness of the negative electrode 6 facing to positive electrode 4 should be made smaller than the above lower limit because the energy density of positive electrode 4 is smaller than that of negative electrode 6. When the thickness of positive electrode 4 exceeds 3.0 mm, the diffusion of lithium ions in positive electrode 4 extremely decreases, thus decreasing the charge/discharge efficiency.

Hereinafter, a detailed description is provided of an exemplary embodiment of the present invention and the advantages thereof mainly for cases using Ti as a transition metal. However, the present invention is not limited to this exemplary embodiment. First, a method of fabricating Cell A1 is described.

(1) Synthesis of Si—Ti Alloy

Si powder and Ti powder dried at a temperature of 110° C. for five hours with a warm-air dryer are mixed to have an elemental molar ratio of 85:15. This mixed powder of 1.7 kg in weight is charged into a stainless vibrating ball mill having an internal volume of 64 liters, with stainless balls each having one inch in diameter of 300 kg. Then, after the inside of the vibrating mill is replaced with argon gas, the powder is pulverized (mechanically alloyed) at an amplitude of 8 mm and a frequency of 1,200 r.p.m. for 60 hours. Thus, a Si—Ti alloy (alloy 11) is prepared.

The Si—Ti alloy is collected in a vibrating dryer with the argon atmosphere maintained. While the inside of the dryer is stirred by vibration, the argon gas is intermittently replaced with an argon/oxygen mixed gas for one hour under the condition that the material temperature is up to 100° C. Thus, Si oxide film 12 and the Ti oxide film, i.e. transition metal oxide film 13, are formed on the surface of the Si—Ti alloy. The volumetric ratio of argon and oxygen in the mixed gas is 79:21.

Further, while stirred by vibration, the atmosphere is intermittently replaced with an argon/oxygen mixed gas having a water vapor amount of 20.6 g/m$^3$ for 30 minutes under the condition that the material temperature is up to 100° C. so that Si oxide film 12 and the Ti oxide film are grown. The volumetric ratio of argon and oxygen in the mixed gas is 79:21. By passing the mixed gas through a sintered filter submerged in ion-exchange water to moisten the mixed gas, the water vapor amount is adjusted to a humidity of 99.9% at 23° C. In this manner, Si oxide film 12 and the Ti oxide film are grown. Thereafter, by selecting particles having diameters up to 63 μm, negative electrode material 10 is prepared.

Observations of XRD show that the Si—Ti alloy includes at least A phases, i.e. Si phases, and B phases, i.e. TiSi$_2$ phases. As a result of calculations of the crystalline size from the peak position and half value width using Scherrer's equation, the Si phase is amorphous and the crystallite size of the TiSi$_2$ phase is 12 nm. The weight ratio of the Si phases and TiSi$_2$ phases is 50:50 on assumption that all of the Ti is changed to TiSi$_2$. The reason for the assumption that all of the Ti has formed TiSi$_2$ is that there is a possibility that Ti—Si$_x$ (x≠2) may exist.

Observations of XPS shows that the Si oxide film is 2.8 nm thick, the Ti oxide film is 2.5 nm thick, and the ratio of the Ti oxide film to Si oxide film 12 is thus 0.89.

(b) Fabrication of Test Cells

Non-aqueous electrolyte secondary batteries, each having a diameter of 6.8 mm and a thickness of 2.1 mm as shown in FIG. 1, are fabricated using negative electrode material 10. Used as the active material for positive electrode 4 is Li$_{0.55}$MnO$_2$ obtained by mixing manganese oxide and lithium hydroxide in a molar ratio of 2:1 and firing the mixture in the air at a temperature of 400° C. for 12 hours. This active material is mixed with acetylene black, i.e. a conductive agent, and aqueous dispersion of fluorocarbon resin, i.e. a binder, so that the weight ratio of the solid contents thereof is 88:6:6. As positive electrode 4, such a mixture is formed into a pellet having a diameter of 4 mm and a thickness of 1.0 mm, and dried at a temperature of 250° C. for 12 hours.

On the other hand, negative electrode material 10, carbon black, i.e. a conductive agent, and polyacrylic acid, i.e. a binder, are mixed so that the weight ratio of the solid contents thereof is 82:20:10. As negative electrode 6, such a mixture is formed into a pellet having a diameter of 4 mm and a thickness of 0.3 mm, and dried at a temperature of 200° C. for 12 hours. Negative electrode 6 as prepared in this manner is used after lithium foil is put thereon.

The weight of positive electrode 4 is set to 41.3 mg, the weight of negative electrode 6 is set to 4.6 mg, and the amount of lithium foil alloyed with negative electrode 6 is set to 0.004 cm$^3$ so that the initial discharge capacity of the battery discharged to a battery voltage of 0V is 7.0 mAh and the electric potential of positive electrode 4 and negative electrode 6 to lithium is 2.0V.

The electrolyte solution as a non-aqueous electrolyte is prepared by dissolving LiN(CF$_3$SO$_2$)$_2$ at a concentration of 1 mol/dm$^3$ into a mixed solvent in a volume ratio of PC:EC:DME=1:1:1. This electrolyte solution in a volume of 0.015 cm$^3$ is charged into a battery container made of positive electrode can 1, negative electrode can 2, and gasket 3. Thus, a coin-shaped test cell is fabricated as Cell A1.

Next, a procedure for fabricating Cell A2 is described. During the growth of Si oxide film 12 and the Ti oxide film, the atmosphere is intermittently replaced with the following gas. The gas is made by mixing an argon/oxygen mixed gas moistened to have a humidity of 99.9% at 23° C. and an argon/oxygen mixed gas not humidified. By this mixing, an argon/oxygen mixed gas is prepared to have a humidity of 80% and a water vapor amount of 16.5 g/m$^3$. Cell A2 is fabricated in a similar manner to Cell A1 except for this gas. Si oxide film 12 is 2.5 nm thick, the Ti oxide film is 2.0 nm thick, and the ratio of the Ti oxide film to Si oxide film 12 is 0.80.

Next, a procedure for fabricating Cell A3 is described. During the growth of Si oxide film 12 and the Ti oxide film, the atmosphere is intermittently replaced with an argon/oxygen mixed gas prepared in a similar manner to Cell A2 to have a humidity of 70% and a water vapor amount of 14.4 g/m$^3$. Cell A3 is fabricated in a similar manner to Cell A1 except for this gas. Si oxide film 12 is 2.3 nm thick, the Ti oxide film is 1.6 nm thick, and the ratio of the Ti oxide film to Si oxide film 12 is 0.70.

Next, a procedure for fabricating Cell A4 is described. During the growth of Si oxide film 12 and the Ti oxide film, the atmosphere is intermittently replaced with an argon/oxygen mixed gas prepared in a similar manner to Cell A2 to have a humidity of 60% and a water vapor amount of 12.4 g/m$^3$. Cell A4 is fabricated in a similar manner to Cell A1 except for this gas. Si oxide film 12 is 2.0 nm thick, the Ti oxide film is 1.2 nm thick, and the ratio of the Ti oxide film to Si oxide film 12 is 0.60.

Next, a procedure for fabricating Cell A5 is described. During the growth of Si oxide film 12 and the Ti oxide film, the atmosphere is intermittently replaced with an argon/oxygen mixed gas prepared in a similar manner to Cell A2 to have a humidity of 50% and a water vapor amount of 10.3 g/m$^3$. Cell A5 is fabricated in a similar manner to Cell A1 except for this gas. Si oxide film 12 is 1.8 nm thick, the Ti oxide film is 0.9 nm thick, and the ratio of the Ti oxide film to Si oxide film 12 is 0.50.

Next, a procedure for fabricating Cell A6 is described. During the growth of Si oxide film 12 and the Ti oxide film, the atmosphere is intermittently replaced with an argon/oxygen mixed gas prepared in a similar manner to Cell A2 to have a humidity of 30% and a water vapor amount of 6.2 g/m$^3$. Cell A6 is fabricated in a similar manner to Cell A1 except for this gas. Si oxide film 12 is 1.6 nm thick, the Ti oxide film is 0.7 nm thick, and the ratio of the Ti oxide film to Si oxide film 12 is 0.44.

Next, a procedure for fabricating Cell A7 is described. During the growth of Si oxide film 12 and the Ti oxide film, the atmosphere is intermittently replaced with the following gas. The gas is made by mixing an argon/oxygen mixed gas moistened to have a humidity of 99.9% at 15° C. and an argon/oxygen mixed gas not humidified. By this mixing, an argon/oxygen mixed gas is prepared to have a humidity of 48% and a water vapor amount of 6.2 g/m$^3$. Cell A7 is fabricated in a similar manner to Cell A1 except for this gas. Cell A7 differs from Cell A6 in that the reaction temperature during the growth of Si oxide film 12 and the Ti oxide film is 15° C. Si oxide film 12 is 1.6 nm thick, the Ti oxide film is 0.7 nm thick, and the ratio of the Ti oxide film to Si oxide film 12 is 0.44.

Next, a procedure for fabricating Cell A8 is described. During the growth of Si oxide film 12 and the Ti oxide film, the atmosphere is intermittently replaced with an argon/oxygen mixed gas moistened to have a humidity of 99.99% at 40° C. and a water vapor amount of 51.1 g/m$^3$. Cell A8 is fabricated in a similar manner to Cell A1 except for this gas. In other words, Cell A8 differs from Cell A1 in that the reaction temperature during the growth of Si oxide film 12 and the Ti oxide film is 40° C., and the water vapor amount is 51.1 g/m$^3$. Si oxide film 12 is 3.2 nm thick, the Ti oxide film is 3.0 nm thick, and the ratio of the Ti oxide film to Si oxide film 12 is 0.94.

Next, a procedure for fabricating Cell A9 is described. During the growth of Si oxide film 12 and the Ti oxide film, the atmosphere is intermittently replaced with an argon/oxygen mixed gas moistened to have a humidity of 99.99% at 60° C. and a water vapor amount of 129.7 g/m$^3$. Cell A9 is fabricated in a similar manner to Cell A1 except for this gas. In other words, Cell A9 differs from Cell A1 in that the reaction temperature during the growth of Si oxide film 12 and the Ti oxide film is 60° C., and the water vapor amount is 129.7 g/m$^3$. Si oxide film 12 is 4.1 nm thick, the Ti oxide film is 4.0 nm thick, and the ratio of the Ti oxide film to Si oxide film 12 is 0.98.

Next, a procedure for fabricating Cell A10 is described. During the growth of Si oxide film 12 and the Ti oxide film, the Si—Ti alloy is placed in ion-exchange water at 23° C., and the water is stirred for 30 minutes. Thereafter, the alloy is dried at 110° C. for five hours with a warm-air drier. Cell A10 is fabricated in a similar manner to Cell A1 except for this step. Si oxide film 12 is 4.1 nm thick, the Ti oxide film is 4.0 nm thick, and the ratio of the Ti oxide film to Si oxide film 12 is 0.98. The ion-exchange water is bubbled with 10 liters/minute of atmospheric air for 60 minutes via a sintered filter submerged in the water, to dissolve oxygen therein.

For comparison with these cells, Cells B1 and B2 are fabricated. For Cell B1, during the growth of Si oxide film 12 and the Ti oxide film, the atmosphere is intermittently replaced with an argon/oxygen mixed gas prepared in a similar manner to Cell A2 to have a humidity of 20% and a water vapor amount of 4.1 g/m$^3$. Cell B1 is fabricated in a similar manner to Cell A1 except for this gas. Si oxide film 12 is 1.5 nm thick, the Ti oxide film is 0.5 nm thick, and the ratio of the Ti oxide film to Si oxide film 12 is 0.33.

For Cell B2, during the growth of Si oxide film 12 and the Ti oxide film, the atmosphere is intermittently replaced with an argon/oxygen mixed gas prepared in a similar manner to Cell A2 to have a humidity of 10% and a water vapor amount of 2.1 g/m$^3$. Cell B2 is fabricated in a similar manner to Cell A1 except for this gas. Si oxide film 12 is 1.4 nm thick, the Ti oxide film is 0.4 nm thick, and the ratio of the Ti oxide film to Si oxide film 12 is 0.29.

For each of these cells, the capacity retention ratio thereof is evaluated in the following manner. In a constant temperature chamber set to 20° C., five cycles of constant current charge/discharge are repeated at a charge-end voltage of 3.0V, a discharge-end voltage of 2.0V, and a charge and discharge current of 0.05 C (1 C being one hour rate current). Then, after having been charged to a cell voltage of 3.5V in the sixth cycle, the cells are stored in the constant temperature chamber set to 80° C. for ten days with the cell voltage maintained. After the storage, the cells are charged at 0.05 C to a cell voltage of 3.0V at 20° C., and discharged to a cell voltage of 2.0V. Then, the discharge capacity after the storage is determined for each cell. The capacity retention ratio is calculated by dividing the discharge capacity after the storage by the discharge capacity in the fifth cycle, to evaluate the overcharge-resistant characteristics of each cell. When the capacity retention ratio is 85% or larger, the overcharge-resistant characteristics are determined excellent.

Figure 3:
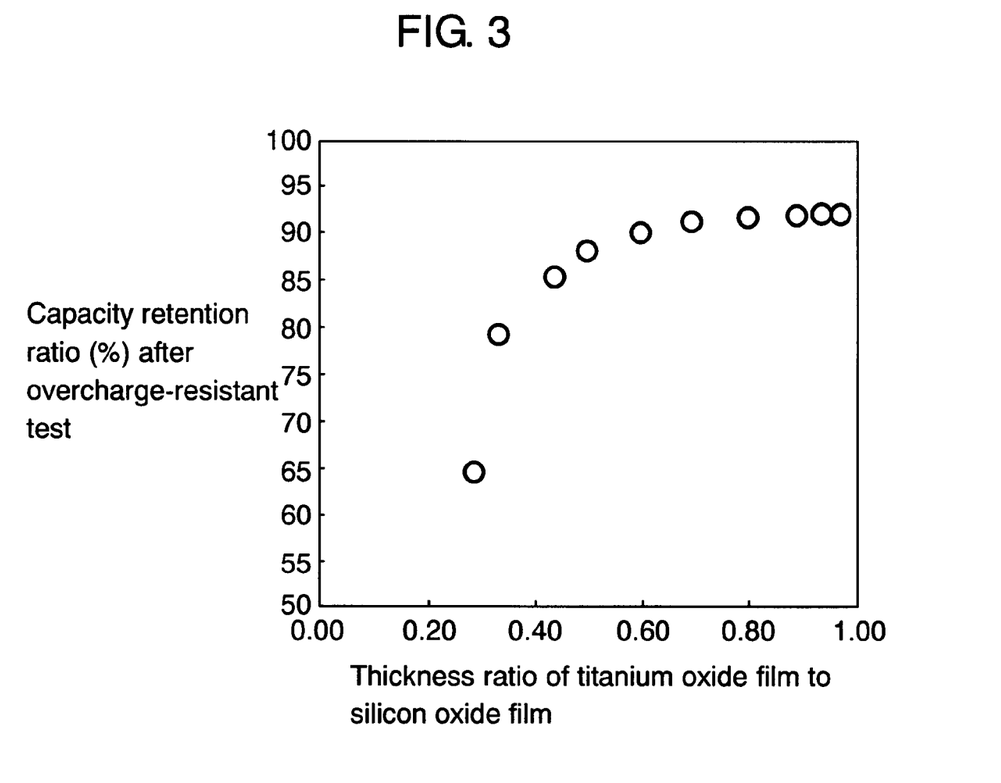
FIG. 3 is graph showing a relation between thickness ratios of a titanium oxide film to a silicon oxide film, and capacity retention ratios after overcharge-resistant tests.

Table 1 shows the specifics of each cell, and Table 2 and FIG. 3 show the evaluation results.

TABLE 1

| Cell | Treatment humidity (%) | Treatment temperature (° C.) | Water vapor amount (g/m$^3$) |
|---|---|---|---|
| A1 | 99.9 | 23 | 20.6 |
| A2 | 80 | | 16.5 |
| A3 | 70 | | 14.4 |
| A4 | 60 | | 12.4 |
| A5 | 50 | | 10.3 |
| A6 | 30 | | 6.2 |
| A7 | 48 | 15 | 6.2 |
| A8 | 99.9 | 40 | 51.1 |
| A9 | | 60 | 129.7 |
| A10 | (Stirred in water) | 23 | — |
| B1 | 20 | | 4.1 |
| B2 | 10 | | 2.1 |

TABLE 2

| Cell | Thickness of Si oxide film (nm) | Thickness of Ti oxide film (nm) | Thickness ratio of oxide films | Capacity retention ratio (%) |
|---|---|---|---|---|
| A1 | 2.8 | 2.5 | 0.89 | 91.7 |
| A2 | 2.5 | 2.0 | 0.80 | 91.5 |
| A3 | 2.3 | 1.6 | 0.70 | 91.1 |
| A4 | 2.0 | 1.2 | 0.60 | 89.9 |
| A5 | 1.8 | 0.9 | 0.50 | 88.0 |
| A6 | 1.6 | 0.7 | 0.44 | 85.3 |
| A7 | 1.6 | 0.7 | 0.44 | 85.1 |
| A8 | 3.2 | 3.0 | 0.94 | 91.8 |
| A9 | 4.1 | 4.0 | 0.98 | 91.9 |
| A10 | 4.1 | 4.0 | 0.98 | 91.8 |
| B1 | 1.5 | 0.5 | 0.33 | 79.2 |
| B2 | 1.4 | 0.4 | 0.29 | 64.7 |

As shown in Table 2 and FIG. 3, with an increase in the water vapor amount in the treatment gas atmosphere, the thickness ratio of the Ti oxide film to Si oxide film 12 increases. With this increase, the capacity retention ratio after overcharge-resistant tests improves. When the water vapor amount is 6.2 g/m$^3$ or larger, excellent capacity retention ratios are shown. The results of Cells A6 and A7 show that the same water vapor amount in the treatment gas atmosphere provides similar thicknesses of the oxide films and capacity retention ratio even with different treatment temperatures and humidity. The capacity retention ratios of Cells A1 to A3, A8, and A9 are 91% or larger. The results of these cells show that the similar results to Cell A10 stirred in water can be obtained when the water vapor amount in the atmosphere is 14.4 g/m$^3$ or larger.

Next, a description is provided of the results of a study on the molar ratio of Si and Ti. First, a procedure for fabricating Cell A11 is described.

Si powder and Ti powder are mixed so that the elemental molar ratio is 68:32. Then, the mixture is subjected to a vibration ball mill in a similar manner to Cell A1. Observations of XRD show that the Si—Ti alloy includes at least A phases, i.e. Si phases, and B phases, i.e. $TiSi_2$ phases. As a result of calculations of the crystallite size from the half value width using Scherrer's equation, the Si phase is amorphous and the crystallite size of the $TiSi_2$ phase is 12 nm. The weight ratio of the $TiSi_2$ phases and Si phases is 97:3 on assumption that all of the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 111:20:10. Cell A11 is fabricated in a similar manner to Cell A1 except for the use of the mixture thus prepared.

Next, a procedure for fabricating Cell A12 is described. Si powder and Ti powder are mixed so that the elemental molar ratio is 69:31. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the Si phase is amorphous and the crystallite size of the $TiSi_2$ phase is 12 nm. The weight ratio of $TiSi_2$ phases and Si phases is 94:6 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 109:20:10. Cell A12 is fabricated in a similar manner to Cell A1 except for the use of the mixture thus prepared.

Next, a procedure for fabricating Cell A13 is described. Si powder and Ti powder are mixed so that the elemental molar ratio is 74:26. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the Si phase is amorphous and the crystallite size of the $TiSi_2$ phase is 12 nm. The weight ratio of the $TiSi_2$ phases and Si phases is 82:18 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 100:20:10. Cell A13 is fabricated in a similar manner to Cell A1 except for the use of the mixture thus prepared.

Next, a procedure for fabricating Cell A14 is described. Si powder and Ti powder are mixed so that the elemental molar ratio is 78:22. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the Si phase is amorphous and the crystallite size of the $TiSi_2$ phase is 12 nm. The weight ratio of the $TiSi_2$ phases and Si phases is 70:30 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 94:20:10. Cell A14 is fabricated in a similar manner to Cell A1 except for the use of the mixture thus prepared.

Next, a procedure for fabricating Cell A15 is described. Si powder and Ti powder are mixed so that the elemental molar ratio is 90:10. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the Si phase is amorphous and the crystallite size of the $TiSi_2$ phase is 12 nm. The weight ratio of the $TiSi_2$ phases and the Si phases is 35:65 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 77:20:10. Cell A15 is fabricated in a similar manner to Cell A1 except for the use of the mixture thus prepared.

Next, a procedure for fabricating Cell A16 is described. Si powder and Ti powder are mixed so that the elemental molar ratio is 95:5. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the Si phase is amorphous and the crystallite size of the $TiSi_2$ phase is 9 nm. The weight ratio of the $TiSi_2$ phases and the Si phases is 18:82 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 71:20:10. Cell A16 is fabricated in a similar manner to Cell A1 except for the use of the mixture thus prepared.

Next, a procedure for fabricating Cell A17 is described. Si powder and Ti powder are mixed so that the elemental molar ratio is 98:2. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the crystallite size of the Si phase is 9 nm and the crystallite size of the $TiSi_2$ phase is 10 nm. The weight ratio of the $TiSi_2$ phases and Si phases is 7:93 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 67:20:10. Cell A17 is fabricated in a similar manner to Cell A1 except for the use of the mixture thus prepared.

Next, a procedure for fabricating Cell A18 is described. Si powder and Ti powder are mixed so that the elemental molar ratio is 99:1. Then, the mixture is subjected to a vibration ball mill in a similar manner to Cell A1. Observations of XRD show that the Si—Ti alloy includes at least Si phases and $TiSi_2$ phases. As a result of calculations of the crystallite size from the half value width using Scherrer's equation, the crystallite size of the Si phase is 9 nm and the crystallite size of the $TiSi_2$ phase is 10 nm. The weight ratio of the $TiSi_2$ phases and the Si phases is 4:96 on assumption that all the Ti is changed to $TiSi_2$. Oxide films are formed on the surface of the Si—Ti alloy in a similar manner to Cell A1. Then, the alloy is mixed with carbon black as a conductive agent, and polyacrylic acid as a binder, in the same volume ratio so that the weight ratio of the solid contents thereof is 66:20:10. Cell A18 is fabricated in a similar manner to Cell A1 except for the use of the mixture thus prepared.

Table 3 shows the evaluation results of these cells in a similar manner to Cell A1.

TABLE 3

| Cell | Molar ratio of Si (%) | Capacity retention ratio (%) | Capacity per volume at charged state (mAh/cm³) |
|------|----------------------|------------------------------|------------------------------------------------|
| A11  | 68                   | 92.1                         | 467                                            |
| A12  | 69                   | 92.0                         | 734                                            |
| A13  | 74                   | 91.9                         | 1485                                           |
| A14  | 78                   | 91.8                         | 1792                                           |
| A1   | 85                   | 91.7                         | 2093                                           |
| A15  | 90                   | 91.4                         | 2224                                           |
| A16  | 95                   | 90.6                         | 2316                                           |
| A17  | 98                   | 88.1                         | 2360                                           |
| A18  | 99                   | 83.7                         | 2374                                           |

Treatment humidity: 99.9%, Treatment temperature: 23° C.

As obvious from Table 3, cells A11 to A17 that have molar ratios of Si in alloy 11 at least 68% and at most 98% show excellent overcharge-resistant characteristics. For Cell A18, the capacity retention ratio after overcharge-resistant tests is low. The reason therefor is considered as follows. In this cell, negative electrode 6 has a volumetric change similar to that using the element Si, and thus maintaining the current-collecting structure therein is difficult.

Table 3 also shows the capacity per volume when Si is charged at 4,200 mA/g to expand by 4.1 times. The weight ratio of the $TiSi_2$ phases and Si phases in Cell A11 is 97:3 on assumption that all the Ti is changed to $TiSi_2$. In other words, the percentage of the Si phases active to lithium in alloy 11 is small. As shown above, this alloy has a smaller capacity density than graphite, and thus is less practical. For this reason, it is preferable that the molar ratio of Si in alloy 11 is not less than 69 and not more than 98.

Next, a description is provided of an example in which a transition metal other than Ti is used. First, a procedure for fabricating Cell C1 is described. Si powder and Ni powder are mixed to have an elemental molar ratio of 84.6:15.4. In a similar manner to Cell A1, the mixture is subjected to a vibrating ball mill. Observations of XRD show that the Si—Ni alloy includes at least Si phases and nickel disilicate ($NiSi_2$) phases. Because the peak positions thereof are overlapped with each other, the Si phases and the $NiSi_2$ phases cannot be separated. As a result of calculations of the crystallite size from the half value width using Scherrer's equation, the crystallite size of the Si phase is 12 nm. The weight ratio of the $NiSi_2$ phases and the Si phases is 54:46 on assumption that all the Ni is changed to $NiSi_2$.

The Si—Ni alloy thus prepared is treated in a similar manner to Cell A1, to form oxide films thereon. Si oxide film 12 is 2.8 nm thick, the Ni oxide film, i.e. transition metal oxide film 13, is 2.6 nm thick, and the thickness ratio of the Ni oxide film to Si oxide film 12 is 0.93.

Negative electrode material 10 thus prepared is mixed with carbon black as a conductive agent, and polyacrylic acid as a binder, so that the weight ratio of the solid contents thereof is 91:20:10. Cell C1 is fabricated in a similar manner to Cell A1 except for the negative electrode material.

For comparison with Cell C1, Cell C2 is fabricated. The Si—Ni alloy having the same composition as Cell C1 is treated in a similar manner to Cell B1, and oxide films are formed on the surface thereon. Si oxide film 12 is 1.5 nm thick, the Ni oxide film is 0.55 nm thick, and the thickness ratio of the Ni oxide film to Si oxide film 12 is 0.37. Cell C2 is fabricated in a similar manner to Cell C1 except for the thickness of the oxide films.

Next, a description is provided of a procedure for fabricating Cell C3. Si powder and Fe powder are mixed to have an elemental molar ratio of 84.0:16.0. Then, the mixed powder is subjected to a vibrating ball mill in a similar manner to Cell A1. Observations of XRD show that the Si—Fe alloy includes at least Si phases and iron disilicate ($FeSi_2$) phases. As a result of calculations of the crystallite size from the peak half value width using Scherrer's equation, the Si phase is amorphous and the crystallite size of the $FeSi_2$ phase is 15 nm. The weight ratio of the $FeSi_2$ phases and the Si phases is 55:45 on assumption that all the Fe is changed to $FeSi_2$.

Oxide films are formed on the surface of the thus prepared Si—Fe alloy in a similar manner to Cell A1. Si oxide film 12 is 2.8 nm thick, the Fe oxide film, i.e. transition metal oxide film 13, is 2.7 nm thick, and the thickness ratio of the Fe oxide film to Si oxide film 12 is 0.96.

Negative electrode material 10 thus prepared is mixed with carbon black as a conductive agent, and polyacrylic acid as a binder, so that the weight ratio of the solid contents thereof is 93:20:10. Cell C3 is fabricated in a similar manner to Cell A1 except for the negative electrode material.

For comparison with Cell C3, Cell C4 is fabricated. The Si—Fe alloy having the same composition as Cell C3 is treated in a similar manner to Cell B1, and oxide films are formed on the surface thereof. Si oxide film 12 is 1.5 nm thick, the Fe oxide film is 0.6 nm thick, and the thickness ratio of the Fe oxide film to Si oxide film 12 is 0.40. Cell C4 is fabricated in a similar manner to Cell C3 except for the thickness of the oxide films.

Table 4 shows the evaluation results of these cells in a similar manner to Cell A1.

TABLE 4

| Cell | Transition metal | Treatment humidity (%) | Thickness ratio of oxide films | Capacity retention ratio (%) |
|------|------------------|------------------------|--------------------------------|------------------------------|
| C1   | Ni               | 99.9                   | 0.93                           | 92.1                         |
| C2   |                  | 20                     | 0.37                           | 78.9                         |
| C3   | Fe               | 99.9                   | 0.96                           | 91.5                         |
| C4   |                  | 20                     | 0.40                           | 73.2                         |

As shown in Table 4, even for a transition metal of Ni or Fe, securing a sufficient thickness of transition metal oxide film 13 with respect to the thickness of Si oxide film 12 by increasing the treatment humidity can improve the capacity retention ratio after the overcharge-resistant test.

Next, a description is provided of cases where the negative electrode material is combined with a different positive electrode active material. First, a procedure for fabricating Cell D1 is described. After manganese dioxide and lithium hydroxide are mixed in a molar ratio of 1:0.8, the mixture is fired in the air at 500° C. for six hours, to obtain $Li_4Mn_5O_{12}$. Except for the use of $Li_4Mn_5O_{12}$ as the active material for positive electrode 4, Cell D1 is fabricated in a similar manner to Cell A1.

For comparison with Cell D1, Cell D2 is fabricated. Except for the use of $Li_4Mn_5O_{12}$ as the active material for positive electrode 4, Cell D2 is fabricated in a similar manner to Cell B1.

Next, a procedure for fabricating Cell D3 is described. After $MnCO_3$ and lithium hydroxide are mixed in a molar ratio of 2:1, the mixture is fired in the air at 345° C. for 32 hours, to obtain $Li_2Mn_4O_9$. Except for the use of $Li_2Mn_4O_9$ as the active material for positive electrode 4, Cell D3 is fabricated in a similar manner to Cell A1.

For comparison with Cell D3, Cell D4 is fabricated. Except for the use of $Li_2Mn_4O_9$ as the active material for positive electrode 4, Cell D4 is fabricated in a similar manner to Cell B1.

Table 5 shows the evaluation results of these cells in a similar manner to Cell A1.

TABLE 5

| Cell | Positive electrode active material | Treatment humidity (%) | Thickness ratio of oxide films | Capacity retention ratio (%) |
|------|------------------------------------|------------------------|--------------------------------|------------------------------|
| D1 | $Li_4Mn_5O_{12}$ | 99.9 | 0.89 | 91.9 |
| D2 |  | 20 | 0.33 | 79.6 |
| D3 | $Li_2Mn_4O_9$ | 99.9 | 0.89 | 92.1 |
| D4 |  | 20 | 0.33 | 79.7 |

As shown in Table 5, even when the positive electrode material is made of $Li_4Mn_5O_{12}$ or $Li_2Mn_4O_9$ instead of $Li_{0.55}MnO_2$, securing a sufficient thickness of transition metal oxide film 13 with respect to the thickness of Si oxide film 12 by increasing the treatment humidity can improve the capacity retention ratio after the overcharge-resistant test.

In the above descriptions, coin-shaped cells are used as examples. The negative electrode material of this exemplary embodiment can be used for an inside-out type, a laminated type, or a wound type battery having cylindrical or prismatic shape.

INDUSTRIAL APPLICABILITY

The present invention provides a negative electrode material for a non-aqueous electrolyte secondary battery that has high capacity and excellent overcharge-resistant characteristics, and a non-aqueous electrolyte secondary battery using the material. Such a non-aqueous electrolyte secondary battery excellent in overcharge-resistant characteristics is useful particularly in memory backup applications.

The invention claimed is:

1. A negative electrode material for a non-aqueous electrolyte secondary battery comprising:
    an alloy including silicon and a transition metal selected from the group consisting of titanium, zirconium, vanadium, molybdenum, tungsten, iron, and nickel wherein the alloy includes an A phase including silicon and a B phase including a crystalline alloy of silicon and the transition metal; and
    a silicon oxide film and an oxide film of the transition metal formed on a surface of the alloy,
    wherein a thickness ratio of the oxide film of the transition metal to the silicon oxide film is at least 0.44 and smaller than 1.

2. The negative electrode material for a non-aqueous electrolyte secondary battery according to claim 1, wherein the A phase is amorphous or microcrystalline.

3. The negative electrode material for a non-aqueous electrolyte secondary battery according to claim 1, wherein the transition metal is at least one of Ti, Fe, and Ni.

4. The negative electrode material for a non-aqueous electrolyte secondary battery according to claim 1, wherein a molar percentage of the silicon in the alloy is at least 69% and at most 98%.

5. A non-aqueous electrolyte secondary battery comprising:
    a negative electrode including a negative electrode material, the negative electrode material comprising:
        an alloy including silicon and a transition metal selected from the group consisting of titanium, zirconium, vanadium, molybdenum, tungsten, iron, and nickel wherein the alloy includes an A phase including silicon and a B phase including a crystalline alloy of silicon and the transition metal; and
        a silicon oxide film and an oxide film of the transition metal formed on a surface of the alloy,
        wherein a thickness ratio of the oxide film of the transition metal oxide film to the silicon oxide film is at least 0.44 and smaller than 1;
    a positive electrode capable of storing and emitting lithium ions; and
    a non-aqueous electrolyte disposed between the negative electrode and the positive electrode.

* * * * *

UNITED STATES PATENT AND TRADEMARK OFFICE
CERTIFICATE OF CORRECTION

PATENT NO.         : 7,754,383 B2
APPLICATION NO.    : 11/793528
DATED              : July 13, 2010
INVENTOR(S)        : Teruaki Yamamoto et al.

It is certified that error appears in the above-identified patent and that said Letters Patent is hereby corrected as shown below:

In column 16, claim 1, line 6 "nickel" should be --nickel,--.

In column 16, claim 5, line 31 "nickel" should be --nickel,--.

Signed and Sealed this

Twenty-sixth Day of October, 2010

David J. Kappos
*Director of the United States Patent and Trademark Office*